US011953154B2

(12) United States Patent
Mendes et al.

(10) Patent No.: US 11,953,154 B2
(45) Date of Patent: Apr. 9, 2024

(54) METHOD AND SYSTEM FOR PRESSURE RELIEF IN A MULTI CHAMBER VESSEL

(71) Applicant: Amtrol Licensing Inc., West Warwick, RI (US)

(72) Inventors: João Pedro Oliveira Pinhão Silva Mendes, Braga (PT); Pedro Alexandre Queiro Silva Vieira, Matosinhos (PT); Jennifer Marie O'Brian, Plain City, OH (US)

(73) Assignee: Amtrol Licensing Inc., West Warwick, RI (US)

( * ) Notice: Subject to any disclaimer, the term of this patent is extended or adjusted under 35 U.S.C. 154(b) by 0 days.

(21) Appl. No.: 17/727,251

(22) Filed: Apr. 22, 2022

(65) Prior Publication Data

US 2023/0341093 A1 Oct. 26, 2023

(51) Int. Cl.
*F17C 13/12* (2006.01)
*F17C 1/00* (2006.01)
*F17C 13/04* (2006.01)

(52) U.S. Cl.
CPC ................ *F17C 13/12* (2013.01); *F17C 1/00* (2013.01); *F17C 13/04* (2013.01); (Continued)

(58) Field of Classification Search
CPC .............. F17C 13/12; F17C 2201/0109; F17C 2201/0166; F17C 2205/0332; F17C 2203/069; B65D 83/70; B65D 51/1638; Y10T 137/1744; Y10T 137/1714; Y10T 137/1752
See application file for complete search history.

(56) References Cited

U.S. PATENT DOCUMENTS 2,663,458 A * 12/1953 MacGlashan, Jr. ... F16K 17/162 220/89.2
2,742,014 A 4/1956 Pleasants
(Continued)

FOREIGN PATENT DOCUMENTS

| | | | |
|---|---|---|---|
| GB | 505322 | A | 5/1939 |
| GB | 2051955 | B | 5/1983 |
| GB | 2419381 | A | 4/2006 |

OTHER PUBLICATIONS

International Search Report and Written Opinion from corresponding International Application No. PCT/US2023/019384 dated Jul. 17, 2023.

*Primary Examiner* — Shawn M Braden
(74) *Attorney, Agent, or Firm* — Tucker Ellis LLP

(57) ABSTRACT

A vessel includes a body having an interior surface that defines an interior space. The vessel further includes a flexible membrane located within the interior space of the vessel. The interior space includes a first chamber at least partially defined by the flexible membrane, and a second chamber at least partially defined by the flexible membrane and a portion of the interior surface of the body. The vessel includes a pressure relief device configured to vent contents of the second chamber to an exterior of the body when the second chamber reaches a first predefined pressure. The flexible membrane is configured to tear or puncture when the first chamber reaches a second predefined pressure that is less than or equal to the first predefined pressure to prevent dangerously high pressures within the first chamber.

20 Claims, 8 Drawing Sheets

(52) U.S. Cl.
CPC ................. *F17C 2201/0109* (2013.01); *F17C 2201/0166* (2013.01); *F17C 2205/0332* (2013.01); *F17C 2209/22* (2013.01)

(56) References Cited

U.S. PATENT DOCUMENTS

| | | | | |
|---|---|---|---|---|
| 3,722,734 | A | 3/1973 | Raidl, Jr. | |
| 4,162,692 | A | 7/1979 | Greer et al. | |
| 4,352,437 | A | 10/1982 | Bernatt | |
| 4,638,838 | A | 1/1987 | Richard et al. | |
| 4,993,602 | A * | 2/1991 | Casey | B65D 83/70 137/859 |
| 6,186,178 | B1 | 2/2001 | Darroux | |
| 9,005,787 | B2 * | 4/2015 | Kim | H01M 50/3425 429/82 |
| 2008/0171248 | A1 * | 7/2008 | Suess | H01M 8/04201 429/444 |
| 2009/0025400 | A1 | 1/2009 | Barthelemy et al. | |
| 2010/0050622 | A1 | 3/2010 | Stroganov | |
| 2021/0123568 | A1 * | 4/2021 | Kronholz | F17C 13/04 |

* cited by examiner

METHOD AND SYSTEM FOR PRESSURE RELIEF IN A MULTI CHAMBER VESSEL

BACKGROUND

Vessels can be used for storage and/or dispensing of gasses, liquefied compressed gasses or liquids. Certain vessels can include multiple internal chambers separated by a flexible membrane, for example, a diaphragm, a bladder, or a bag. In vessels where one of the chambers does not have a means for relieving excess pressure, dangerous over-pressure situations can occur. For example, high pressure situations may occur due to a fire, excess heat, or overfilling. Such high-pressure situations may cause dangerous consequences such as explosions and catastrophic ruptures creating projectiles, which may injure people and damage equipment.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems described herein can be utilized to provide a vessel that includes a body having an interior surface that defines an interior space. A flexible membrane such as a diaphragm, a bag, or a bladder can be located within the interior space of the vessel. The interior space can include a first chamber at least partially defined by the flexible membrane, and a second chamber at least partially defined by the flexible membrane and a portion of the interior surface of the body. A pressure relief device can also be coupled to the body. The pressure relief device is configured to vent contents of the second chamber to an exterior of the body when the second chamber reaches a first predefined pressure. The flexible membrane is configured to tear or puncture when the first chamber reaches a second predefined pressure that is less than or equal to the first predefined pressure. In this manner, dangerously high pressures in the first chamber can be prevented.

In one embodiment, the vessel includes a piercing member extending into the second chamber. The piercing member is designed and positioned to puncture the flexible membrane when the first chamber reaches the second predefined pressure.

In another embodiment, the flexible membrane is constructed and sized such that the flexible membrane rips or tears upon the first chamber reaching the second predefined pressure.

In another aspect, the vessel can be constructed with walls that include one or more non-metallic materials sandwiched between two metallic layers. In a situation where excess heat or flame is applied to the vessel, thermal expansion of the metallic layers and/or contraction or softening of the one or more non-metallic layers create a pressure relief channel. The pressure relief channel allows for contents from the interior of the vessel to vent from the interior through the pressure relief channel, and through the pressure relief device to the exterior of the vessel.

To the accomplishment of the foregoing and related ends, the following description and drawings set forth certain illustrative aspects and implementations. These are indicative of but a few of the various ways in which one or more aspects may be employed. Other aspects, advantages and novel features of the disclosure will become apparent from the following detailed description when considered in conjunction with the drawings.

DETAILED DESCRIPTION

Figure 1:
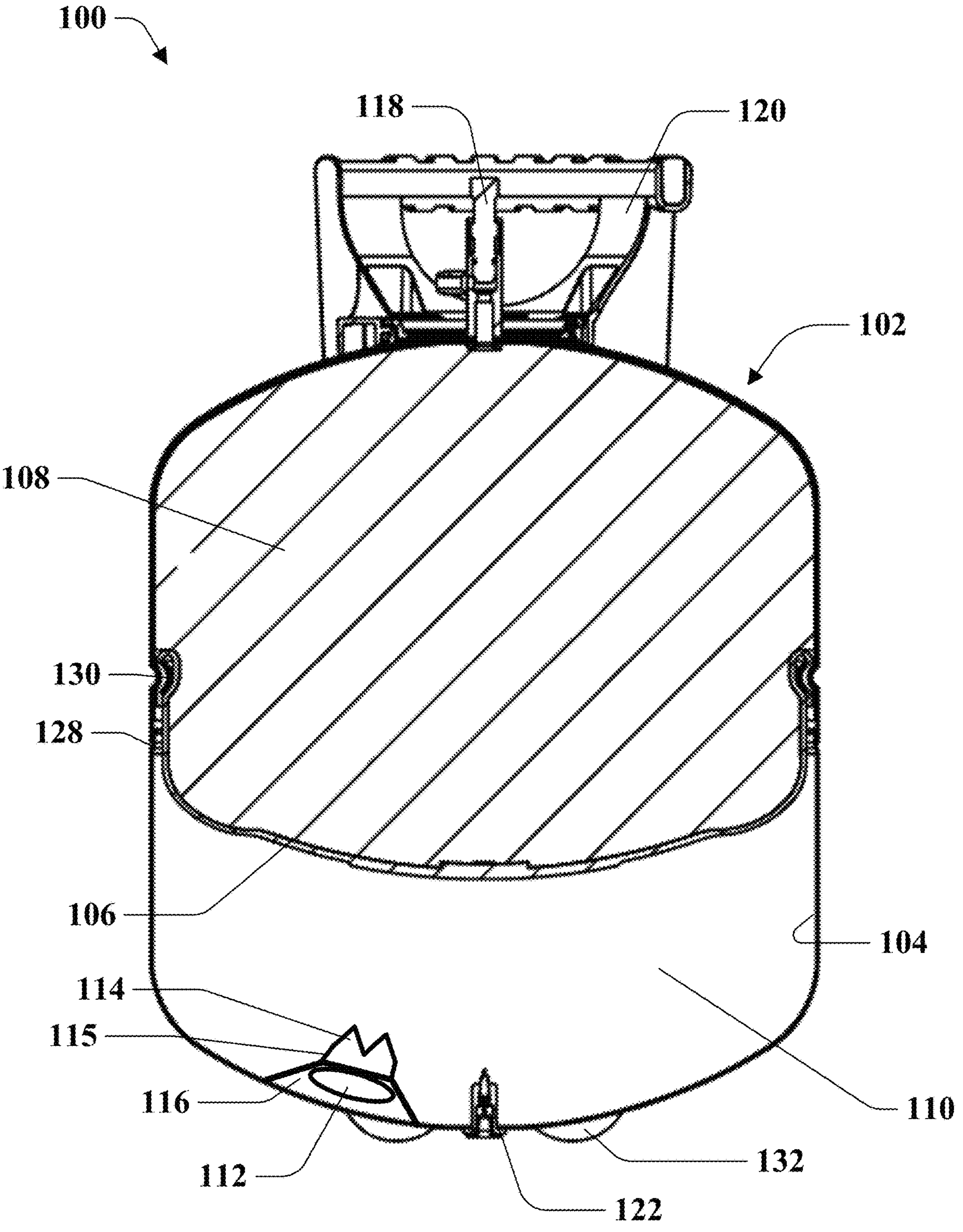
FIG. 1 is a component diagram illustrating an example embodiment of a vessel, where one or more techniques and/or one or more systems described herein may be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A vessel, as used herein, is defined as any container capable of storing and/or dispensing contents contained within. By way of example and not limitation, a vessel, as used herein, may be a pressure vessel.

A vessel can include two or more chambers separated by a flexible membrane such as a diaphragm, a bag, or a bladder. The vessel can include a pressure relief device located on the body of the vessel. This pressure relief device can function to relieve/vent pressure from one chamber that is in direct fluid communication with the pressure relief device. However, the pressure relief device is unable to relieve/vent pressure from the other one or more chambers while the flexible membrane is intact. Rather, the vessel can include one or more means to tear or puncture the flexible membrane so that the pressure of the one or more other chambers may also be relieved and vented to the exterior of the vessel through the pressure relief device.

Turning now to FIG. 1, a vessel 100 is shown. The vessel 100 can be, for example, a storage tank or an expansion tank such as a diaphragm tank or a bladder tank, among others. Vessel 100 includes a body 102 that can be constructed of any material chosen using sound engineering judgment. By way of example, and not limitation, the body 102 can be constructed using one or more of metal, such as steel or aluminum, carbon fiber, glass fiber, or a polymer such as high density polyethylene. The body 102 includes an interior surface 104 that defines an interior space of the vessel 100.

The vessel 100 can further include a flexible membrane 106 located within the interior space of the vessel 100. The flexible membrane 106 can form distinct chambers within the interior space of the vessel 100. In one embodiment, a first chamber 108 can be at least partially defined by the flexible membrane 106. A second chamber 110 can be at least partially defined by the flexible membrane 106 and a portion of the interior surface 104 of the body 102. It should be appreciated that certain embodiments of the vessel 100 can include additional flexible membranes and/or additional chambers. During normal operation of the vessel 100, the flexible membrane 106 causes the first chamber 108 and the second chamber 110 to be fluidly isolated from each other such that there is no fluid communication between the first chamber 108 and the second chamber 110 within the interior space of the vessel 100. By way of example, and not limitation, the flexible membrane 106 can be constructed from an elastomer (e.g. ethylene propylene diene monomer (EPDM), butyl, nitrile, neoprene or silicone rubber), a film such as a polyester film (e.g. biaxially-oriented polyethylene terephthalate (BoPET)), which may be a single-ply film or a multi-ply film, or a foil.

The vessel 100 can further include a pressure relief device 112 coupled to the body 102. The pressure relief device 112 can be, for example, a pressure relief valve, a burst disc, or any other pressure-activated relief mechanism. The pressure relief device 112 can be located on the vessel 100 body 102 on the perimeter of the second chamber 110, and can be configured to vent the contents of the second chamber 110 to the exterior of the body 102 when the second chamber 110 reaches a first predefined pressure. The first predefined pressure can be selected to prevent excess pressure from building within the vessel 100 and damaging the vessel 100 or causing a dangerous explosion or projectile. In one embodiment, the first predefined pressure can be selected to be greater than or equal to 325 pounds per square inch (psi). In another embodiment, the first predefined pressure can be selected to be greater than or equal to 112 psi. In one embodiment, when the pressure within the second chamber 110 reaches the first predefined pressure, the pressure relief device 112 opens to vent the contents of the second chamber 110 to the exterior of the vessel 100 and cause the second chamber 110 to have ambient pressure. It should be appreciated that the first predefined pressure can be a particular pressure, a particular pressure with a tolerance, or a range of pressures.

In certain embodiments, the vessel can include a piercing member 114. The piercing member 114 extends into the second chamber 110 towards the flexible membrane 106. In different embodiments, the piercing member 114 can extend directly from an interior surface 104 of the body 102 into the second chamber 110, extend directly from the pressure relief device 112, extend from a standoff 115 that separates the piercing member 114 from the pressure relief device 112 by a distance, or extend from another component of the vessel 100. The piercing member 114 can be, for example, one or more razors, burrs, serrated surfaces, needles, or other sharp or rough surface.

The piercing member 114 is configured to puncture the flexible membrane 106 when the first chamber 108 reaches a second predefined pressure. In certain embodiments, the second predefined pressure is less than or equal to the first predefined pressure at which the pressure relief device 112 operates to vent the second chamber 110. During normal operation when the pressure relief device 112 is not activated, the first chamber 108 and the second chamber 110 share a common pressure. If the flexible membrane 106 remains intact long after the pressure relief device 112 opens and begins venting the second chamber 110, there is a risk that the flexible membrane 106 can continue to expand and seal or significantly restrict the pressure relief device 112, thereby preventing the vessel 100 from being properly vented. In this situation, the dangerous high pressure can build again within the vessel 100. Accordingly, the flexible membrane 106 and/or piercing member 114 can be designed to cause the flexible membrane 106 to tear or puncture prior to making contact with the pressure relief device 112. To achieve this end, the second predefined pressure can be chosen to be less than or equal to the first predefined pressure. It should be appreciated that the second predefined pressure can be a particular pressure, a particular pressure with a tolerance, or a range of pressures.

Other features may be included within the vessel 100 to prevent the flexible membrane 106 from sealing the pressure relief device 112. For example, a portion of the interior surface 104 within the second chamber 110, a surface of the flexible membrane 106, or both can include one or more projections. These projections can include one or more of channels, bumps, ridges, or knurls, among others. The projections can prevent a complete seal from being formed in the event that the flexible membrane 106, or a portion thereof, happens to make contact with the pressure relief device 112 or any aperture that provides access to the pressure relief device 112.

In certain embodiments, the vessel 100 can include a pocket 116 formed in the body 102 of the vessel 100. The pocket 116 can be formed in the body 102 such that the pocket extends inwards into the second chamber 110. For example, the pocket 116 can include a convex shape in the body 102, indented within the second chamber 110. The standoff 115 can extend from the pocket 116 into the second chamber 110, and the piercing member 114 can extend from the standoff 115 into the second chamber 110, as shown in FIG. 1. The pressure relief device 112 can be installed into the pocket 116. For example, the pressure relief device 112 can fit into and be mounted on an exterior of the indent formed by the pocket 116.

As an example of operation of an embodiment of the vessel 100, the pressure increases within the vessel 100. The vessel's 100 pressure increase causes the pressure to increase in both the first chamber 108 and the second chamber 110. As the pressure increases in the first chamber 108, the flexible membrane 106 expands into space previously occupied by the second chamber 110. It should be appreciated that the body 102 maintains its shape as the flexible membrane 106 expands. The flexible membrane 106 continues to expand as the pressure of the first chamber 108 increases towards the second predefined pressure, and the flexible membrane 106 approaches the piercing member 114. As the pressure of the first chamber 108 reaches the second predefined pressure, the flexible membrane 106 contacts the piercing member 114 with enough force to be punctured by the piercing member 114. Simultaneously, or soon after the flexible member 106 is punctured by the piercing member 114, the second chamber 110 reaches the first predefined pressure, which causes the pressure relief device 112 to open.

In one embodiment, the flexible membrane 106 is configured to be punctured and/or tear at a second predefined pressure, but only after the pressure relief device 112 opens at the first predefined pressure. In this situation, both the first chamber 108 and the second chamber 110 can reach the first predefined pressure. The pressure relief device 112 is configured to open at the first predefined pressure, which causes the pressure of the second chamber 110 to drop to 0 psi. Simultaneously with the decrease in pressure of the second chamber 110, the flexible membrane 106 expands, causing the pressure of the first chamber 108 to also decrease to less than the first predefined pressure at which the pressure relief device 112 opened. Over time, as pressure continues to build in the first chamber 108, the flexible membrane 106 continues to expand and contacts the piercing member 114 with enough force to puncture the flexible membrane 106.

In one embodiment, the flexible membrane 106 is configured to tear when the first chamber reaches the second predefined pressure. The strength, thickness, and type of material can be selected to ensure that the flexible membrane 106 fails when the first chamber 108 reaches the second predefined pressure. It should be appreciated that while this embodiment may not require a piercing member 114 to puncture the flexible membrane 106, a piercing member 114 may still be included as a backup to ensure that the flexible membrane 106 is punctured in the event that the flexible membrane 106 does not tear as expected.

The vessel 100 can further include components such as a valve 118 coupled to the vessel 100, and in fluid communication with the first chamber 108. A shroud 120 can also encircle the valve 118 to provide protection to the valve 118 and also provide handles for grasping and lifting the vessel 100. A propellant valve 122 can also be coupled to the body 102 to provide a selective fluid communication between the interior space of the vessel 100 and a source of a propellant used to create a pressure differential between the second chamber 110 and the exterior of the vessel 100 so that the contents of the first chamber 108 can be expelled out of the valve 118. In one embodiment, the propellant valve 122 provides selective fluid communication between the second chamber 110 and a source of a propellant. In this embodiment, the propellant valve 122 can be utilized by a user for filling the second chamber 110 with a pressurized gas such as pressurized air, nitrogen, carbon dioxide, or compressed liquified gas such as propane, butane or refrigerant, among others. The propellant valve 122 can extend into the second chamber 110. In certain embodiments, the propellant valve 122 can include a piercing member 114 extending therefrom into the second chamber 110 towards the flexible membrane 106. In these embodiments, the propellant valve 122 can include the sole piercing member 114, or it could also include an auxiliary piercing member 114 in addition to a primary piercing member 114 located elsewhere on the vessel 100 (e.g. on the pressure relief device 112, pocket 116, or standoff 115). In another embodiment, a portion of the propellant valve 122 that extends into the second chamber 110 is a piercing member 114.

Figure 2:
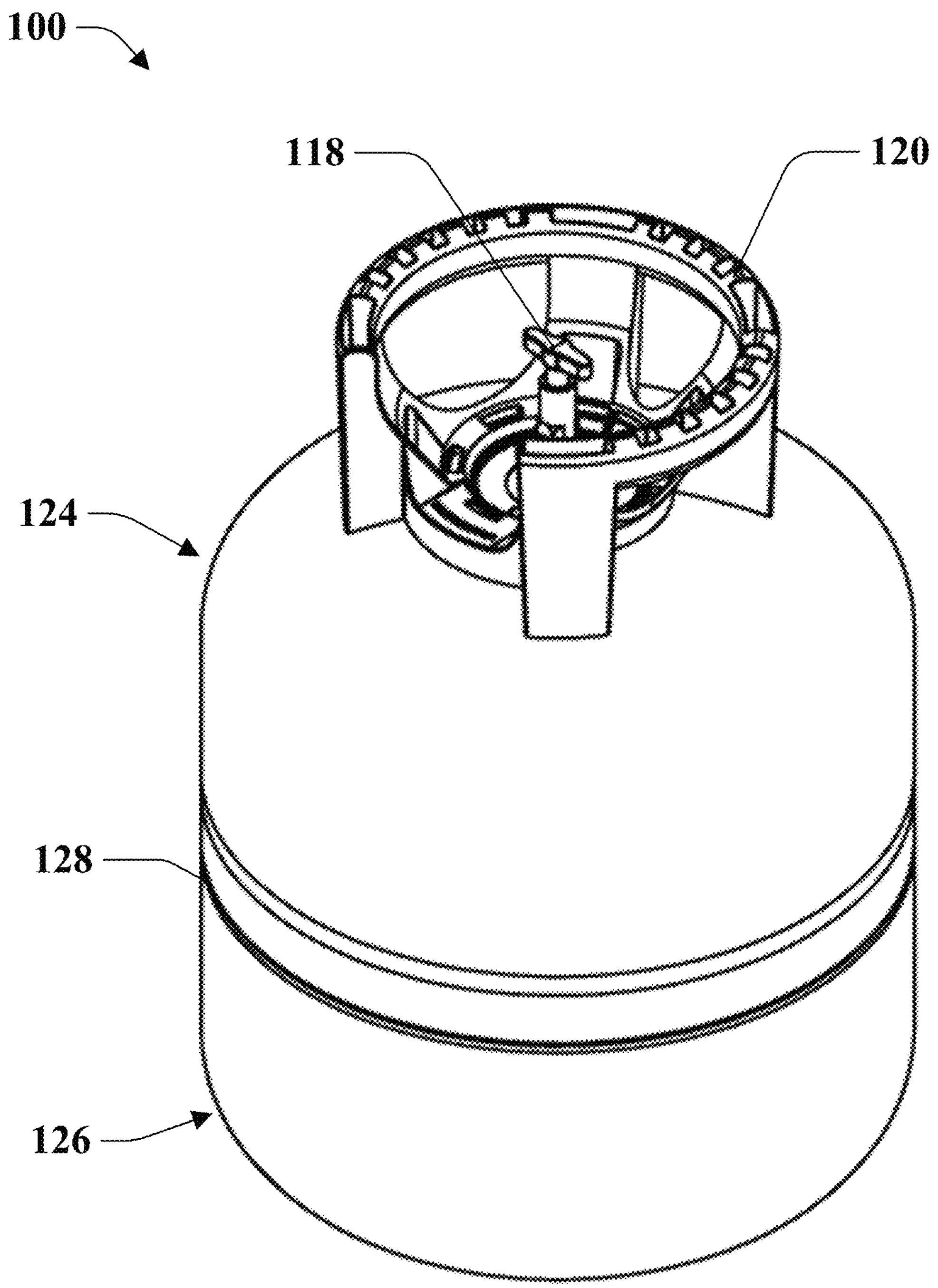
FIG. 2 is a top perspective view of an example embodiment of a vessel.
Figure 3:
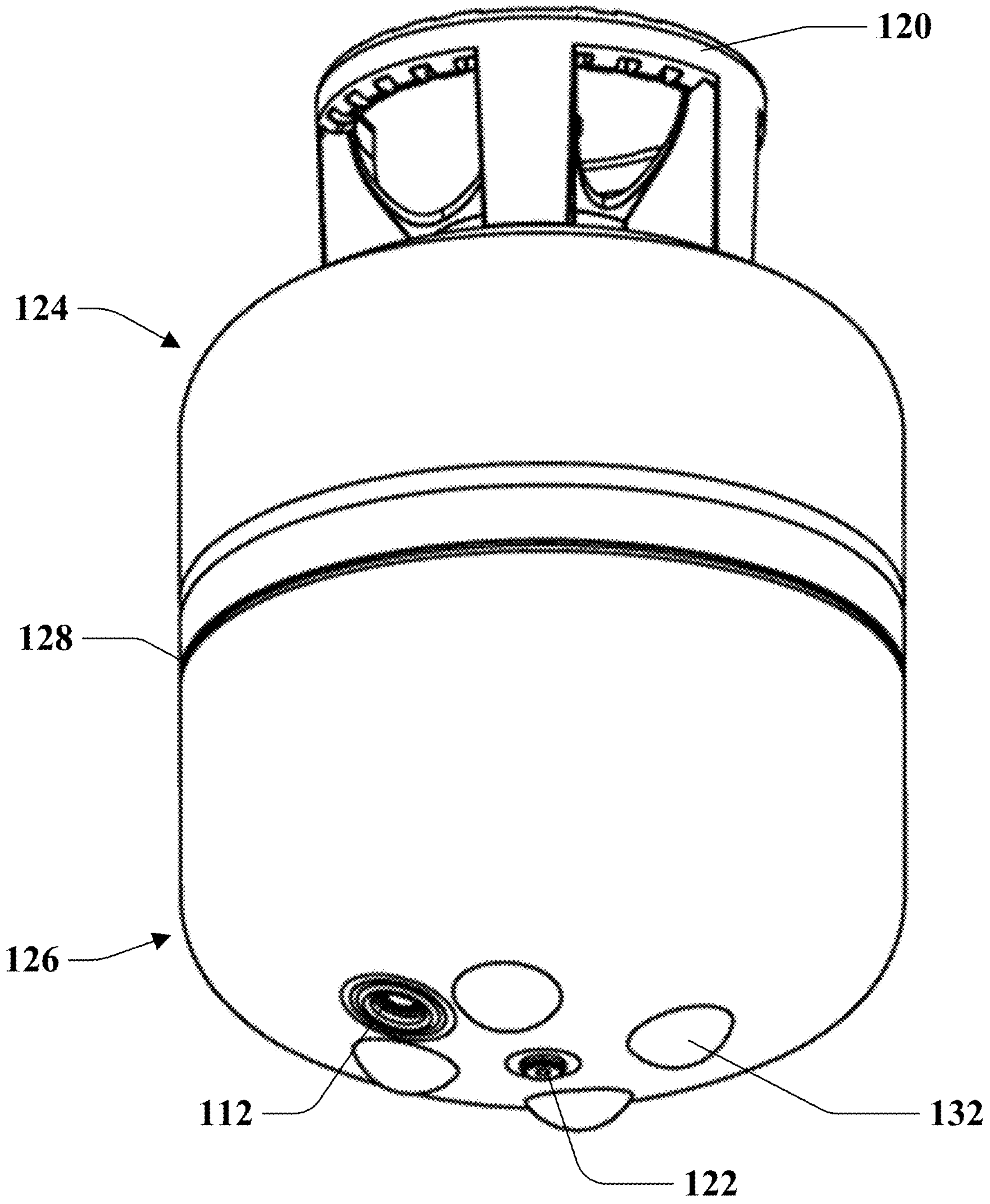
FIG. 3 is a bottom perspective view of an example embodiment of a vessel.

With further reference to FIG. 2 and FIG. 3, the body 102 can be constructed from a first portion 124 and a second portion 126 that are connected by, for example, welding, brazing, crimping, or flange. The connection of the first portion 124 and the second portion 126 can create a seam 128. In certain embodiments, the flexible membrane 106 can be crimped to at least one of the first portion 124 or the second portion 126 of the vessel 100 body 102. In certain embodiments, the flexible membrane 106 is crimped between the first portion 124 or the second portion 126, and a crimping ring 130, which extends around the inner circumference of the vessel 100 body 102. In other embodiments, the body 102 of vessel 100 can be seamless.

In certain embodiments, both of the first portion 124 and the second portion 126 include a convex shell and a cylindrical sidewall portion. The first portion 124 can be configured to receive the valve 118, which provides selective fluid communication between the first chamber 108 and the exterior of the body 102. The valve 118 can be used either for filling the vessel 100, dispensing contents of the vessel 100, or both. A shroud 120 can also be mounted to the first portion 124. The second portion 126 can include one or more of the pressure relief device 112, the piercing member 114, and the propellant valve 122. The second portion 126 can further include a stand 132 such as a footring or plurality of dimples for feet on which the vessel 100 can stand. The stand 132 provides balance and support for the vessel 100. In one embodiment, the pressure relief device 112 and the piercing member 114 are both located on the convex shell of the second portion 126. Specifically, any weldments and openings for the pressure relief device 112 and/or the piercing member 114 are both located within the innermost 80% portion of the radius of the convex shell, if located on the convex top portion of the second portion 126. There are no location limitations, however, if pressure relief device 112 and/or piercing member 114 are on the side walls of the second portion 126. It should be appreciated that the vessel 100 can be operable while positioned in any orientation, including with the first portion 124 oriented upwards and the second portion 126 oriented downwards, the first portion 124 oriented downwards and the second portion 126 oriented upwards, or the vessel 100 oriented on its side such that the first portion 124 and the second portion 126 extend along a common horizontal plane.

Figure 4A:
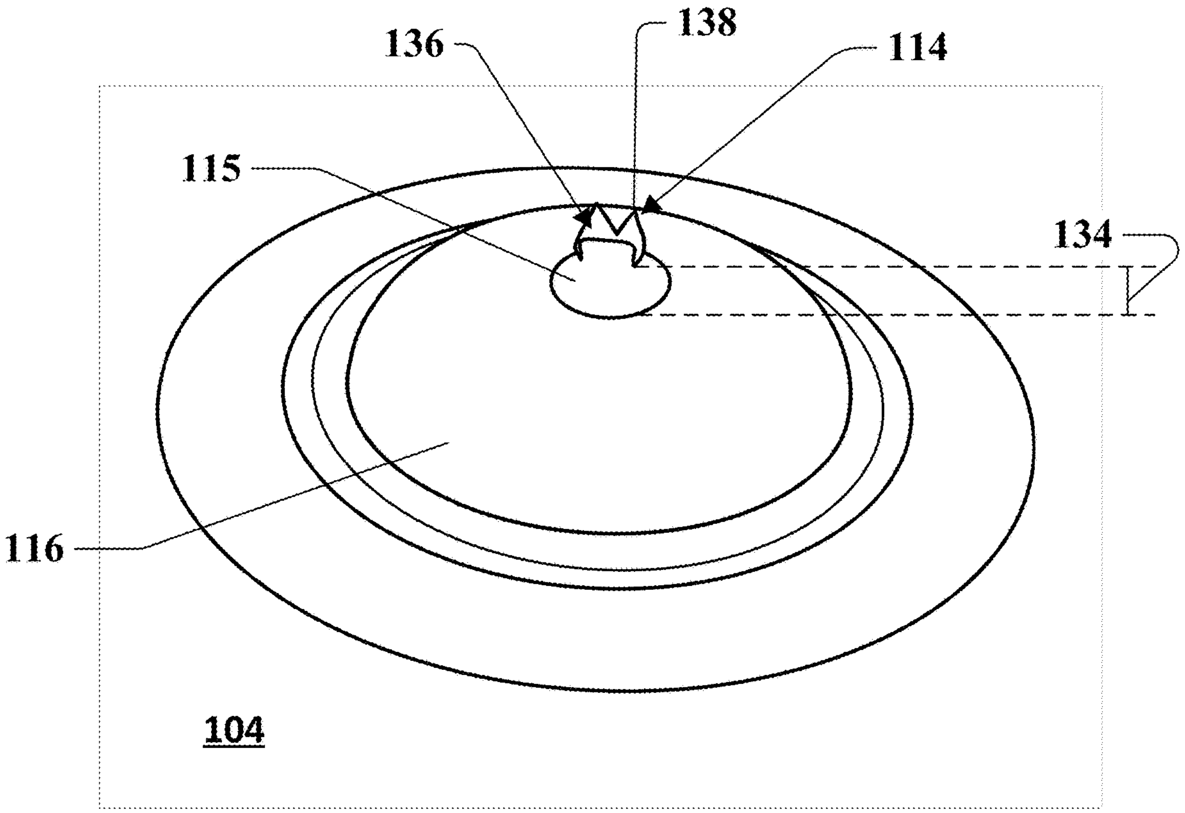
FIG. 4A is an enlarged view of an exemplary piercing member.
Figure 4B:
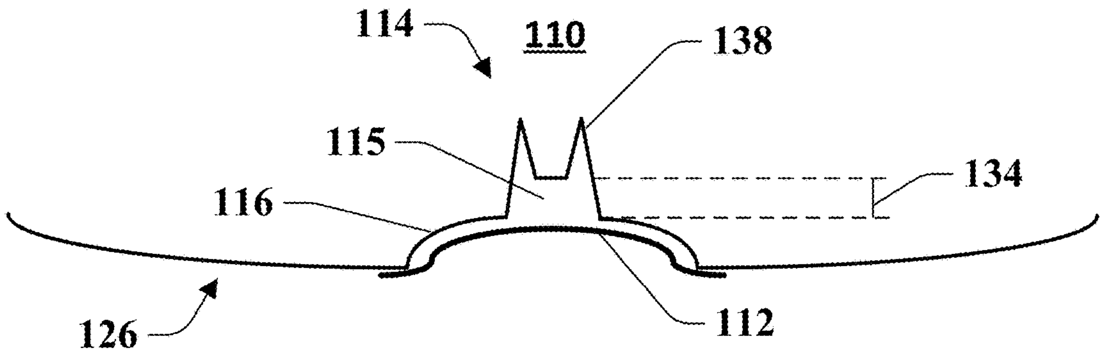
FIG. 4B is a cross sectional view of an exemplary pocket.

Turning now to FIGS. 4A and 4B, an exemplary piercing member 114 is shown. The piercing member 114 can extend from the standoff 115, which separates the piercing member 114 from the pressure relief device 112 by a vertical distance 134 perpendicular to the interior surface 104 of the vessel 100. By separating the piercing member 114 from the pressure relief device 112 by the distance 134, the likelihood of the flexible membrane 106 contacting or sealing the pressure relief device 112 while the pressure relief device 112 is venting the second chamber 110 to the exterior of the vessel 100 is reduced. The standoff 115 can extend from the pocket 116, which at least partially surrounds the pressure relief device 112. In one embodiment, the pocket 116 includes a convex surface extending into the second chamber 110, which also reduces the likelihood of the flexible membrane 106 contacting or sealing the pressure relief device 112 while the pressure relief device 112 is venting the second chamber 110 to the exterior of the vessel 100. As shown in the cross-sectional view of FIG. 4B, the pressure relief device 112 can be mounted at least partially within the indent formed by the pocket 116, on an exterior of the body 102.

The piercing member 114 and the standoff 115 can form an aperture 136 that defines a passageway that provides fluid communication between the pressure relief device 112 and the second chamber 110. In one embodiment, the aperture 136 is at least 10 millimeters in diameter to reduce the likelihood of the flexible membrane 106 from restricting or sealing the pressure relief device 112 when venting the first chamber 108 and/or second chamber 110 to the exterior of the vessel 100. The piercing member 114 can include a plurality of piercing points 138 surrounding the aperture 136. Each of the plurality of piercing points 138 can be separated from each other by a space. In certain embodiments, the piercing member 114 can be formed from the standoff 115. In these embodiments, the piercing member 114, including any piercing points 138, project directly from the standoff 115.

Figure 5A:
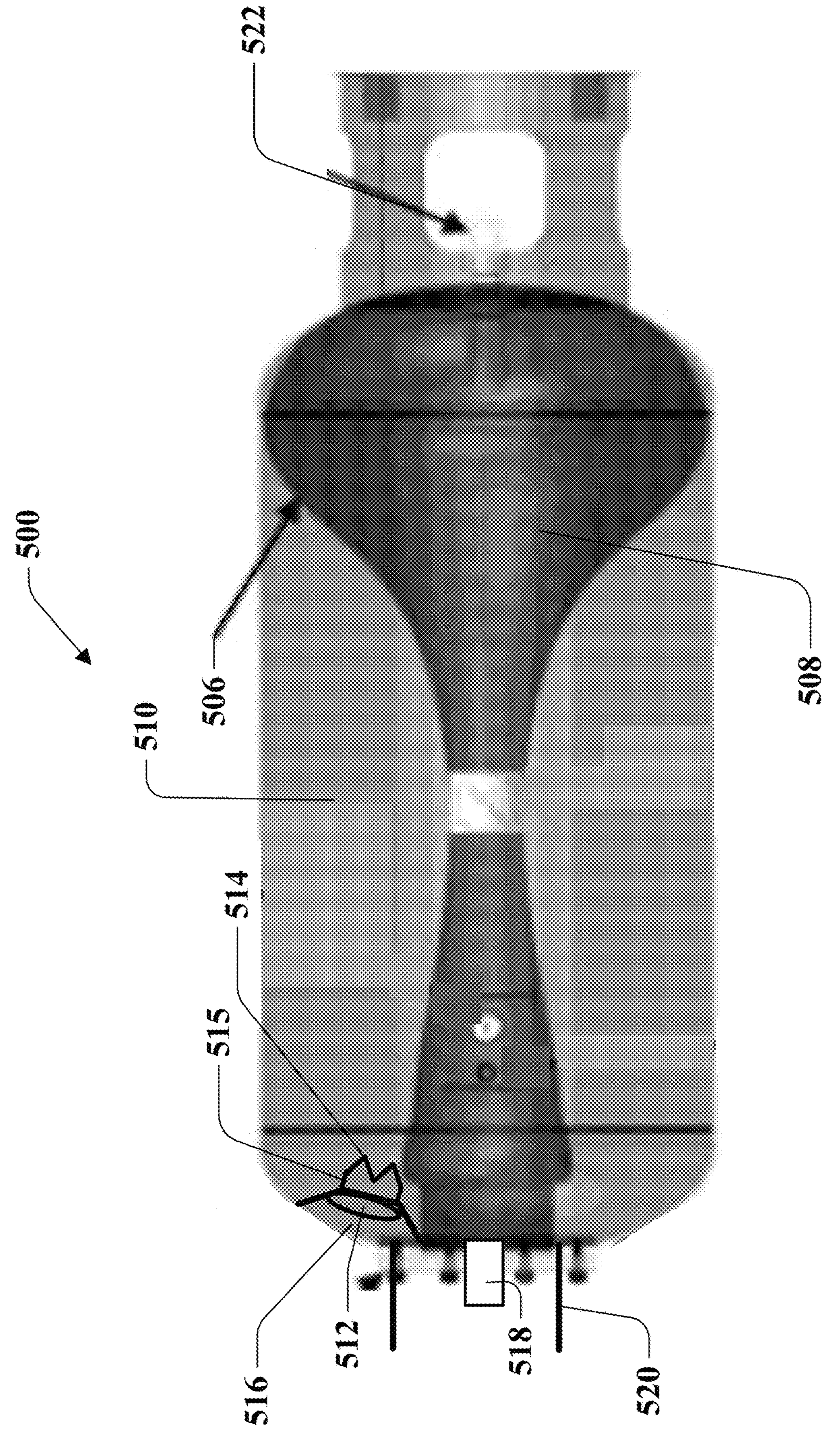
FIG. 5A is a component diagram illustrating another example embodiment of a vessel.

FIG. 5A depicts another exemplary embodiment of a vessel 500. It should be appreciated that the construction of vessel 500 can be similar to that of vessel 100 and include two portions connected together at a seam, or alternatively be seamless. The vessel 500 includes a flexible membrane 506. The flexible membrane 506 is in the form of a bladder or bag that completely defines the first chamber 508. The flexible membrane 506 can be attached to the valve 518 within the vessel 100 or at the junction of the valve 518 and the body 502. The second chamber 510 exists as the area outside of the flexible membrane 506, defined by the inner surface 504 of the vessel 500 and the outside of the flexible membrane 506. Similarly as the embodiments described above with respect to vessel 100, vessel 500 can include a pressure relief device 512 in the body 502 of the vessel 500, and a piercing member 514 that can extend from a standoff 515 that spaces the piercing member 514 from the pressure relief device 512.

Similar to vessel 100, vessel 500 can include a pocket 516 formed in the body 502. The standoff 515 can extend from the pocket 516 into the second chamber 510, and the piercing member 514 can extend from the standoff 515. Vessel 500 can further include a valve 518 and a propellant valve 522 that serve the same functions as in vessel 100 as described with respect to FIG. 1. The valve 518 can be at least partially surrounded by a shroud 520. It should be appreciated that the propellant valve 522 may also be at least partially surrounded by a second shroud. Propellant valve 522 can be located on an end of the vessel 500 (as shown) or it can alternatively be located on a side wall of the vessel 500. If the propellant valve 522 is mounted to either end of the vessel 500, it may be mounted within the innermost 80% portion of the radius of the convex shell that makes up an end of the vessel 500. Vessel 500 can further include a stand (not shown in FIG. 5A) such as a footring or a plurality of dimples for feet on which the vessel 500 can stand. The stand can be included on either end of the vessel 500, and any valve or shroud (e.g. valve 518, shroud 520, propellant valve 522) may be sized, positioned, or omitted accordingly to allow the stand to function without obstruction. For example, a stand can be included near the propellant valve 522. In this case, the propellant valve 522 can be sized to not extend past the stand, and a shroud around the propellant valve 522 can be omitted. In another example, a shroud (e.g. shroud 520, or a shroud around the propellant valve) can also function as a stand.

Figure 5B:
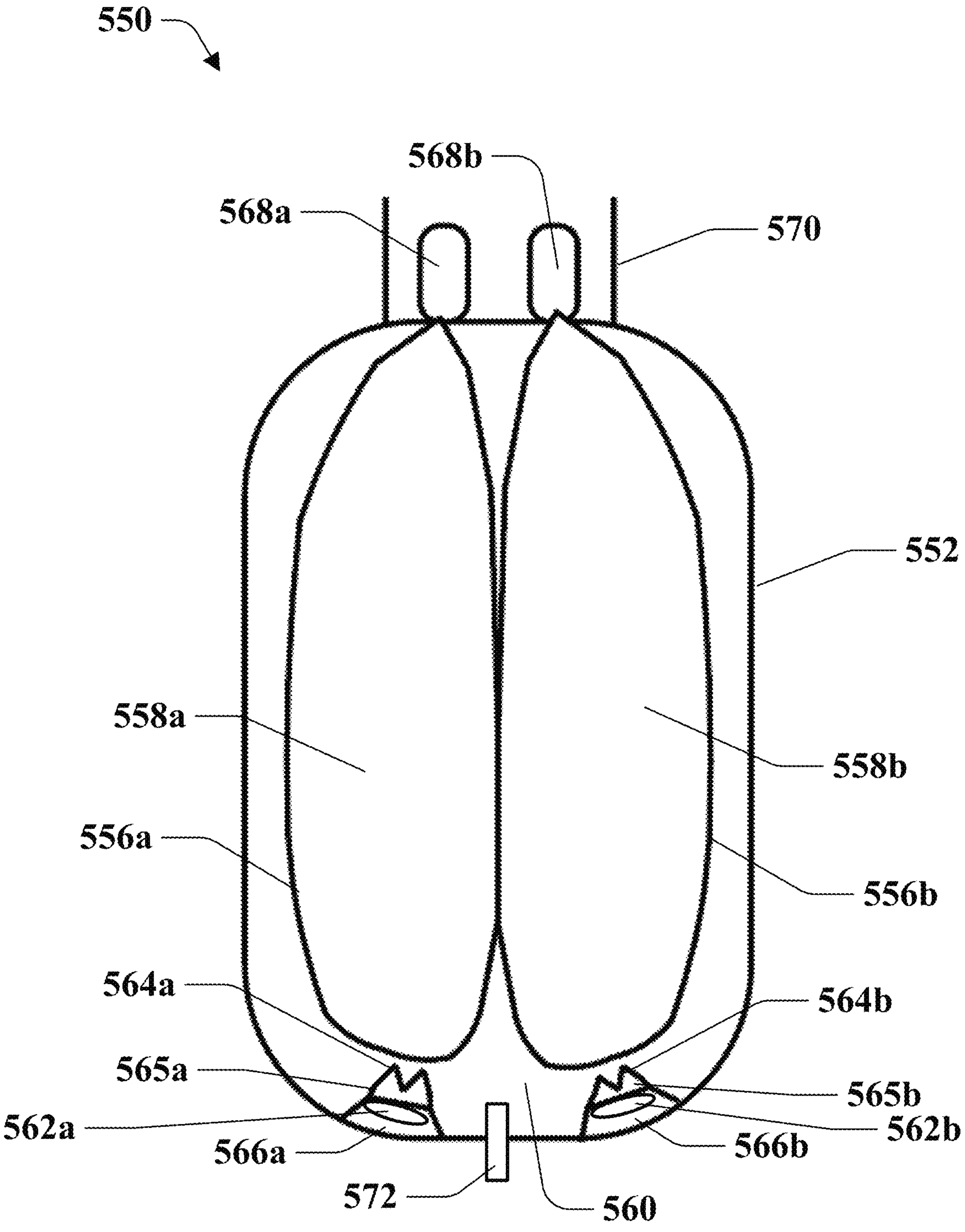
FIG. 5B is a component diagram illustrating another example embodiment of a vessel.

FIG. 5B depicts another exemplary embodiment of a vessel 550. Vessel 550 includes a first flexible membrane 556*a* that at least partially defines a first chamber 558*a*, and a second flexible membrane 556*b* that at least partially defines a second chamber 558*b*. The vessel 550 also includes a third chamber 560 at least partially defined by the body 552 of the vessel 550. Vessel 550 can include a first valve 568*a* that provides selective fluid communication into and out of the first chamber 558*a* and a second valve 568*b* that provides selective fluid communication into and out of the second chamber 558*b*. In certain embodiments, the first valve 568*a* and the second valve 568*b* are integrated into a single valve body. A shroud 570 can surround both the first valve 568*a* and the second valve 568*b*, or the vessel 550 can include a shroud 570 for each of the first and second valves 568*a*, 568*b*. Vessel 550 can include at least one of a first piercing member 564*a*, a first standoff 565*a*, and/or a first pocket 566*a*, which correspond to the first flexible membrane 556*a*, and function in the same manner as described in the other embodiments above. For example, the first piercing member 564*a* can be arranged and configured to puncture the first flexible membrane 556*a* when the first chamber 558*a* reaches a particular pressure. Further, vessel 550 can include at least one of a second piercing member 564*b*, a second standoff 565*b*, and/or a second pocket 566*b*, which correspond to the second flexible membrane 556*b*, and function in the same manner as described in the other embodiments above. For example, the second piercing member 564*b* can be arranged and configured to puncture the second flexible membrane 556*b* at a particular pressure of the second chamber 558*b*. The vessel 550 can include at least one pressure relief device 562*a*, 562*b* to selectively vent pressure from the third chamber 560 to the exterior of the vessel 550. For example, a first pressure relief device 562*a* can be mounted within the first pocket 566*a* and/or the second pressure relief device 562*b* can be mounted within the second pocket 566*b*.

Figure 6:
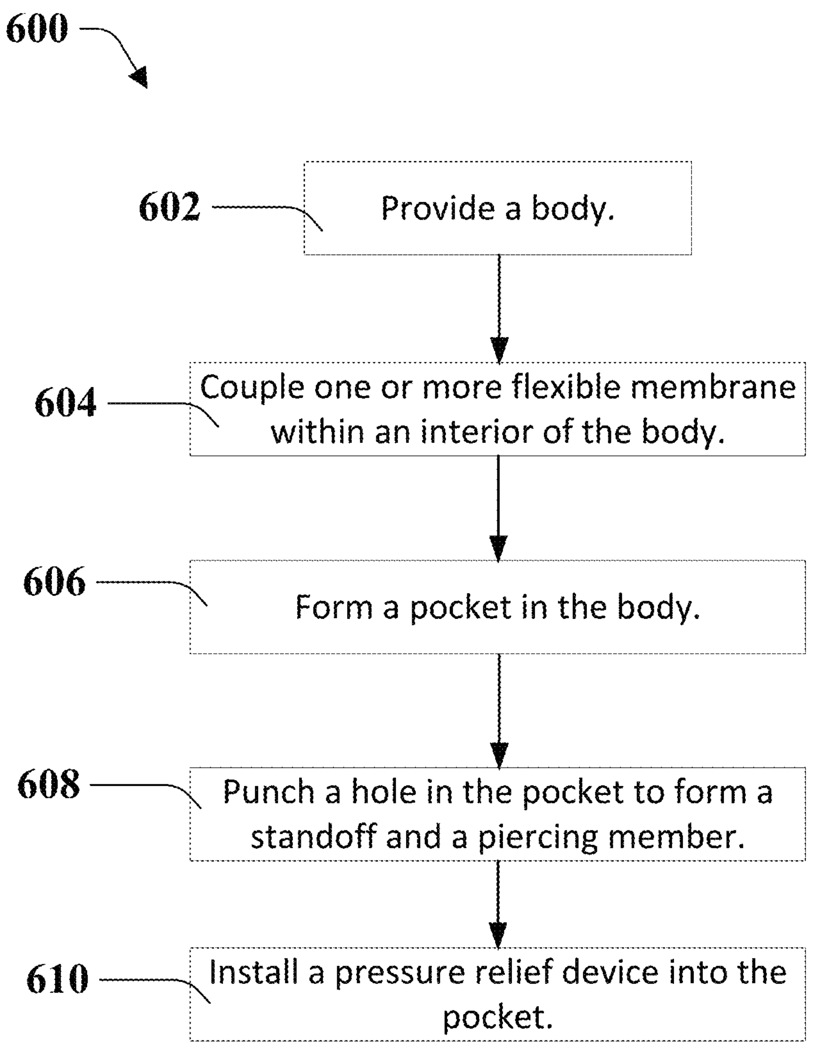
FIG. 6 is a flow chart depicting an exemplary method of constructing a vessel.

Turning now to FIG. 6, a method for constructing a vessel 100 is depicted. At reference numeral 602, a body 102 is provided. At reference numeral 604, one or more flexible membranes 114 are coupled within an interior of the body 102 to create at least a first chamber 108 and a second chamber 110 within the body 102. For example, the flexible membrane 106 can be crimped to at least one of the first portion 124 or the second portion 126 with a crimping ring 130, or the flexible membrane 106 can attach to a valve 118 coupled with the body 102. At reference numeral 606, a pocket 116 is formed in the wall of the body 102. In one embodiment, the pocket 116 can be formed to include a convex shape indented within the second chamber 110. In certain embodiments, the pocket 116 can be formed using a die. At reference numeral 608, a hole is punched in the pocket 116 to form a standoff 115 and a piercing member 114 that includes an aperture 136 and piercing points 138 surrounding the aperture 136 and projecting from the standoff 115. The aperture 136 can act as an entrance to a passageway that provides fluid communication between a pressure relief device 112 and the second chamber 110. For example, in an embodiment where the pocket 116 has a convex shape, the hole is punched from the inside of the convex shape (corresponding to the exterior of the vessel 100) outwards so that the piercing points 138 extend outwards from the convex surface of the pocket 116. In other words, the punching force is directed inwards towards the interior of the body 102. In one embodiment, the aperture 136 is created to be at least 10 millimeters in diameter. At reference numeral 610, a pressure relief device 112 is installed into the pocket 116 such that the pressure relief device 112 provides selective fluid communications between the second chamber 110 and an exterior of the body 102 when the pressure relief device 112 is activated at the first predefined pressure.

Figure 7:
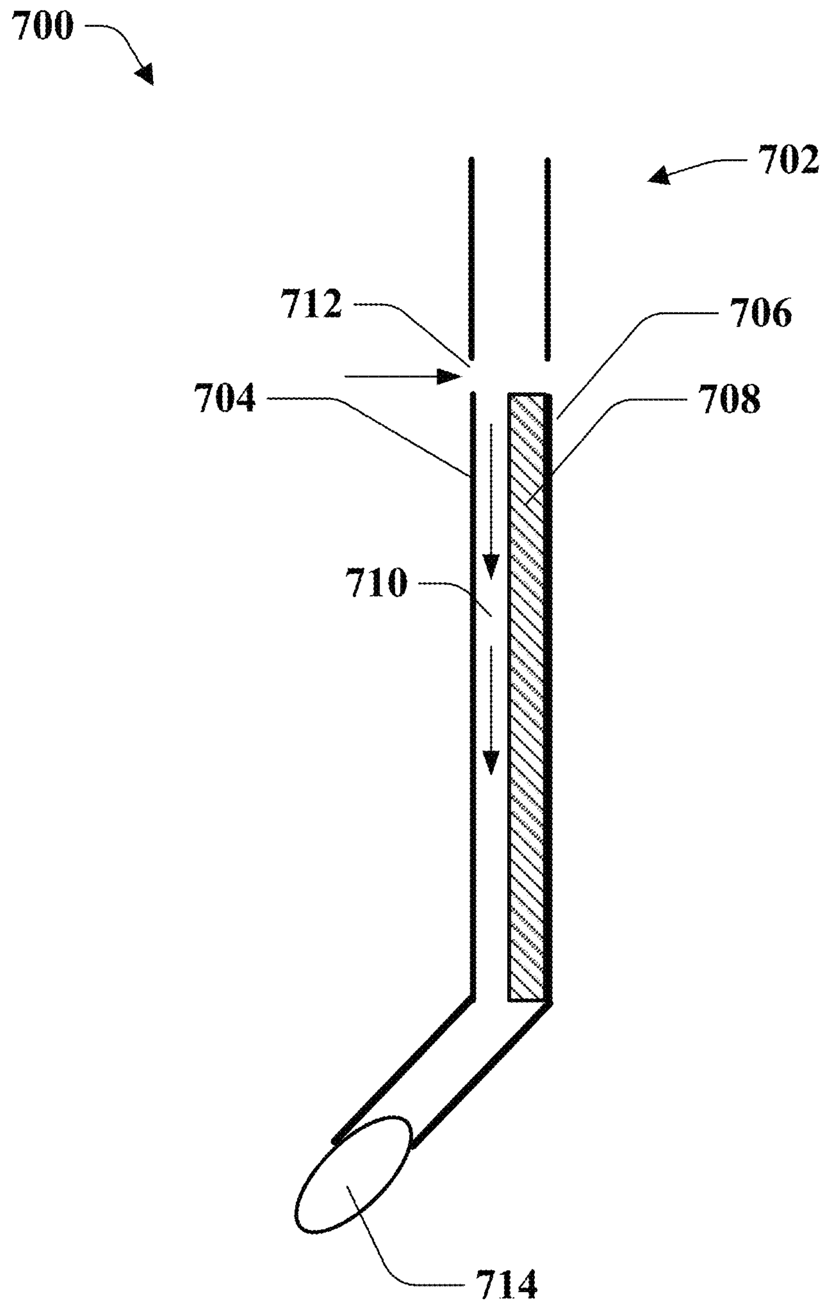
FIG. 7 is a cross-sectional view of an example embodiment of a vessel wall.

Turning now to FIG. 7, an exemplary embodiment of a vessel body 702 is shown. Vessel body 702 can include a first metal surface 704 and a second metal surface 706 positioned substantially parallel to each other. In certain embodiments, the first metal surface 704 and the second metal surface 706 can be made of steel. The body 702 can further include a layer of non-metallic material 708 between the first metal surface 704 and the second metal surface 706. The non-metallic material 708 can include a single layer or multiple layers, and can be constructed of a single material or multiple materials. In an embodiment, the non-metallic material 708 is a portion of a flexible membrane 106 such as a diaphragm, a bag, or a bladder. In certain embodiments, the non-metallic material 708 can melt when the body 702 is exposed to flames or extreme heat. By way of example and not limitation, the non-metallic material 708 can be made of one or more of polypropylene or a rubber, including Butyl, EPDM rubber, or a blend of Butyl and EPDM Rubber. In one embodiment, the non-metallic material 708 includes a first layer made of polypropylene and a second layer made of EPDM rubber. The material of the first metal surface 704, the second metal surface 706, and the non-metallic material 708 can be chosen and configured such that when the body 702 is exposed to heat, the first and second metal surfaces 704, 706 expand due to their coefficient of thermal expansion. The expansion or bending action of the first and second metal surfaces 704, 706 creates at least one pressure relief route 710 in between at least one of the first metal surface 704 and the non-metallic material 708, or the second metal surface 706 and the non-metallic material 708.

The first metal surface 704 can form an interior of a vessel body 702 and the second metal surface 706 can form an exterior of the vessel body 702. The non-metallic material 708 can be compressed in between the first metal surface 704 and the second metal surface 706. In certain embodiments, the non-metallic material 708 can be compressed to less than 50% of its uncompressed thickness. In still other embodiments, the non-metallic material 708 can be compressed to less than 20% of its uncompressed thickness. In certain embodiments, the thickness of the non-metallic material can be approximately 0.26 inches when uncompressed, and as thin as 0.05 inches when in a compressed state between the first metal surface 704 and the second metal surface 706. The first metal surface 704 can be thicker than the second metal surface 706. During normal operation when there is no fire or excessive heat present, there exists a seal between the first metal surface 704 and the non-metallic material 708 such that the pressure relief route 710 is non-existent.

In certain embodiments, the first surface 704 can have a curved shape. In this embodiment, the non-metallic material 708 can have a corresponding curved shape to create a seal during normal operation. The non-metallic material 708 can also have a curved shape that is a mirrored image of the curved shape of the first surface 704. The first metal surface 704 can be designed to be more rigid than the second metal surface 706. This feature can be accomplished either by designing the first metal surface 704 to have a stronger shape (e.g. curved, arched, concave) than the second metal surface 706, constructing the first metal surface 704 from a stronger material than the second metal surface 706, or by constructing the first metal surface to have a greater thickness than the second metal surface 706. In such a configuration, the second metal surface 706 bends outwards when heated by an external heat source, which causes the curvature of the non-metallic material 708 to relax. The relaxation of the curvature of the non-metallic material 708 loosens the seal between the first metal surface 704 and the non-metallic material 708, and eventually creates a pressure relief route 710 between the first metal surface 704 and the non-metallic material 708. The pressure relief route 710 can lead directly to an exterior of the vessel 700 or to a pressure relief device 714, which can then vent the contents of the vessel 700 to the exterior of the vessel 700. It should be appreciated that the non-metallic material 708 can be designed to act as a thermal insulator, which further accentuates a thermal expansion difference between first metal surface 704 and second metal surface 706.

In one embodiment, the non-metallic material 708 (e.g. a flexible membrane, or rigid liner) is crimped between the first metal surface 704 and the second metal surface 706 at a joint 712. During normal operation of the vessel 700, the joint 712 creates a seal so that the contents of the vessel 700 cannot escape from the interior of the vessel 700. When heat is applied to the body 702 that causes the first and/or second metal surface 704, 706 to expand and/or bend near the joint 712, the joint 712 can then open to provide an entrance for the contents of the vessel 700 to escape through the at least one pressure relief route 710. The pressure relief route 710 can lead directly to an exterior of the vessel 700 or to a pressure relief device 714, which can then vent the contents of the vessel 700 to the exterior of the vessel 700.

It should be appreciated that the pressure relief route 710 can be created in various ways. For example, if the vessel 700 body 702 is subject to rapid external thermal activity (e.g. 1200 degrees Fahrenheit in 2 minutes or less), the sealing surfaces between the first and second metal surfaces 704, 706, and the non-metallic material 708 is relaxed due to differences in thermal expansion between the materials and/or softening of the non-metallic material 708, resulting in the opening and formation of the pressure relief route 710. In another example, slower external thermal activity can cause the non-metallic material 708 to melt, and therefore open and form the pressure relief route 710 between the first metal surface 704 and the second metal surface 706.

In another embodiment, the vessel 700 body 702 can include a meltable component. In one example, the valve coupled with body 702 and utilized for filling and/or dispensing of contents of the vessel 700 can be constructed of a meltable material. In this manner, if the vessel 700 is exposed to excess external heat, the valve or other meltable component will melt and provide a path for the pressurized contents of the vessel 700 to escape.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, "at least one of A and B", or "at least one of A or B" and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features, ranges, and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A vessel, comprising:
- a body comprising an interior surface that defines an interior space;
- a flexible membrane located within the interior space of the vessel, wherein the interior space includes:
  - a first chamber at least partially defined by the flexible membrane; and
  - a second chamber at least partially defined by the flexible membrane and a portion of the interior surface of the body; and
- a pressure relief device coupled to the body, wherein the pressure relief device is configured to vent contents of the second chamber to an exterior of the body when the second chamber reaches a first predefined pressure;
- wherein the flexible membrane is configured to tear or puncture when the first chamber reaches a second predefined pressure that is less than or equal to the first predefined pressure.

2. The vessel of claim 1, further comprising:
- a piercing member extending into the second chamber, wherein the piercing member is configured to puncture the flexible membrane when the first chamber reaches the second predefined pressure.

3. The vessel of claim 2, wherein the piercing member is coupled to the pressure relief device.

4. The vessel of claim 2, further comprising,
- a pocket formed in the body of the vessel and extending into the second chamber, the pocket having an exterior surface and an interior surface, wherein the pressure relief device is coupled to the exterior surface of the pocket and the piercing member extends from the interior surface of the pocket.

5. The vessel of claim 4, further comprising a standoff extending from the interior surface of the pocket and separating the piercing member from the pressure relief device by a distance.

6. The vessel of claim 5, wherein the piercing member and the standoff define a passageway that provides fluid communication between the pressure relief device and the second chamber.

7. The vessel of claim 6, wherein the piercing member comprises a plurality of piercing points surrounding the passageway, and a plurality of spaces in between each of the plurality of piercing points.

8. The vessel of claim 4, wherein the interior surface of the pocket includes a convex surface.

9. The vessel of claim 1, wherein at least one of the interior surface within the second chamber or a surface of the flexible membrane includes one or more projections configured to prevent the flexible membrane from restricting fluid communication between the interior space and the exterior of the body through the pressure relief device.

10. The vessel of claim 1, wherein the first predefined pressure is greater than or equal to 112 pounds per square inch (psi).

11. The vessel of claim 1, wherein the flexible membrane is constructed from an elastomer, single-ply film, multi-ply film, polyester, or a foil.

12. The vessel of claim 1, wherein the body is configured to maintain its shape as the flexible membrane expands.

13. The vessel of claim 1, wherein the body comprises a first portion and a second portion, wherein the flexible membrane is crimped to at least one of the first portion or the second portion with a crimping ring extending around a circumference of the body.

14. The vessel of claim 13, wherein the first portion is configured to receive a valve that provides selective fluid communication between the first chamber and the exterior of the body, and the pressure relief device is coupled to the second portion.

15. A vessel, comprising:
- a body comprising an interior surface that defines an interior space;
- a flexible membrane located within the interior space of the vessel, wherein the interior space includes:
  - a first chamber at least partially defined by the flexible membrane; and
  - a second chamber at least partially defined by the flexible membrane and a portion of the interior surface of the body;
- a pressure relief device coupled to the body, wherein the pressure relief device provides selective fluid communication between the second chamber and an exterior of the body;
- a piercing member extending into the second chamber; and
- a standoff separating the piercing member from the pressure relief device by a distance.

16. The vessel of claim 15, wherein the second chamber is in fluid communication with the pressure relief device through the piercing member and the standoff.

17. The vessel of claim 15, further comprising,
- a pocket formed in the body of the vessel, the pocket having an exterior surface and an interior surface that includes a convex surface extending into the second chamber, wherein the pressure relief device is coupled to the exterior surface of the pocket and the piercing member extends from the interior surface of the pocket.

18. The vessel of claim 17, wherein the standoff and the piercing member are formed from, and project directly from the pocket.

19. The vessel of claim 15, wherein the piercing member includes a plurality of piercing points arranged around an aperture, wherein each of the plurality of piercing points is separated by a gap.

20. A method of constructing a vessel, comprising:
- providing a body;
- coupling a flexible membrane to the body such that the flexible membrane extends within an interior of the body to create a first chamber and a second chamber within the body;
- forming a pocket in the body;

punching a hole in the pocket to form a standoff and a piercing member that includes an aperture and piercing points surrounding the aperture and projecting from the standoff, and installing a pressure relief device into the pocket such that the pressure relief device provides selective fluid communication between the second chamber and an exterior of the body.

* * * * *